UNITED STATES PATENT OFFICE.

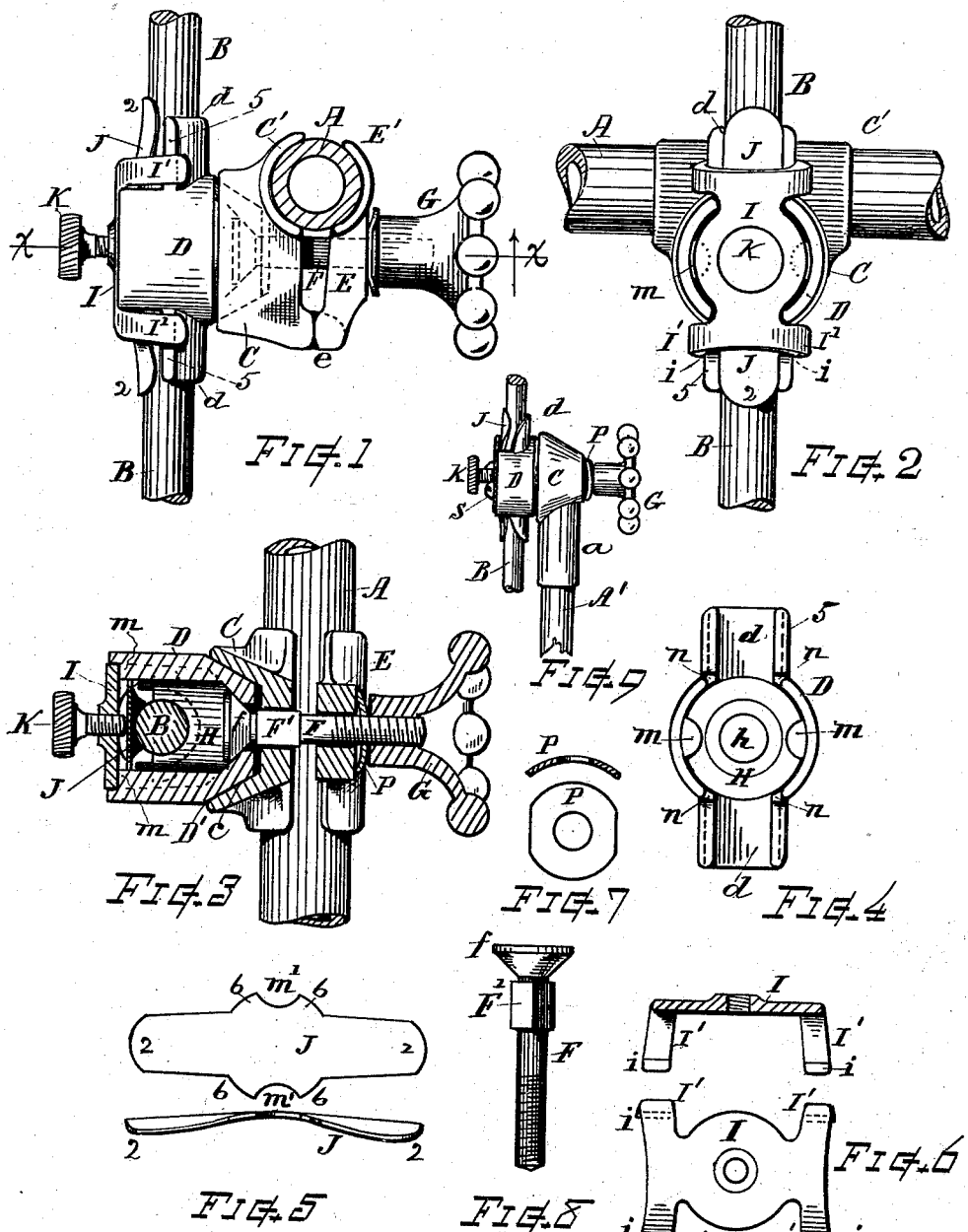

OTIS C. WHITE, OF WORCESTER, MASSACHUSETTS.

COMPOUND SWIVELING AND CLAMPING JOINT MECHANISM.

SPECIFICATION forming part of Letters Patent No. 505,584, dated September 26, 1893.

Application filed March 6, 1893. Serial No. 464,636. (No model.)

*To all whom it may concern:*

Be it known that I, OTIS C. WHITE, a citizen of the United States, residing at Worcester, in the county of Worcester and State of Massachusetts, have invented a new and useful Compound Swiveling and Clamping Joint Mechanism, of which the following, together with the accompanying drawings, is a specification sufficiently full, clear, and exact to enable persons skilled in the art to which this invention appertains to make and use the same.

This invention relates to that class of mechanism, an example of which is disclosed in Letters Patent No. 369,143, heretofore granted me, which is employed for connecting two rods, bars or tubes in a manner to afford convenient adjustment of the same in longitudinal, rotary or diagonal directions relatively one with the other, to bring an article or part supported thereby to any desired position.

My present invention consists in certain improvements in the construction and mode of operation embodied in the mechanism as hereinafter described; the objects being—first, to render the swiveling action of the rod-carrier independent upon the binder-screw head to avoid liability of loosening or tightening the binder when movement of the joint is imparted by leverage of the rod; second, to afford, in joint mechanism of the class named, facilities for supporting the secondary rod and permitting, without manipulation of the fastening devices, easy flexure at the joint; also the longitudinal and rotative adjustment of the supported rod and the frictional retention of the same at any position of adjustment by merely placing the part where desired; third, to provide tension regulating devices in connection with means for frictionally holding the supported rod, whereby the yielding grip or pressure thereon can be varied as desired to afford ease and smoothness of adjustment and effective retention of the parts at any position within its range of movement; fourth, to perfect certain details in construction and render the mechanism compact, simple, convenient and economical for manufacture. These objects I attain by mechanism such as illustrated and explained in the following description; the particular subject matter claimed being hereinafter definitely specified.

In the drawings, Figure 1 is a side view of my improved compound swiveling and clamping joint mechanism. Fig. 2 is an end view of the same. Fig. 3 is a sectional view taken at line $x\,x$ Fig. 1 looking in the direction of the arrow. Fig. 4 is an end view of the rod-carrier or swiveling-head. Fig. 5 shows a plan and side view of the bearing-plate or rod-retaining spring. Fig. 6 shows a side and sectional view of the swivel-head cap-plate as made with crab arms. Fig. 7 shows a side and sectional view of the yielding washer for the binder. Fig. 8 shows a side view of the axis-bolt or binder-stud, and Fig. 9 shows a modification adapted for use upon the end of a supporting rod.

Referring to parts, A denotes one of the bars or rods which will be termed the supporting or the primary rod, and B indicates the other rod which will be termed the supported or the secondary rod. These bars or rods can be either solid or tubular as desired. In practice one of them will ordinarily serve as a standard or support, while the other will be the rod or arm for carrying a screen, head-rest or any other article or instrument which it is desired to have upheld at any convenient position of universal adjustment.

C indicates the main part or body of the clamping joint, having at one side a socket, conoidal recess or frictional surface $c$ for receiving the swivel-head or rod-carrier D which is fitted to match said socket or friction surface. Said body is also best provided with a seating portion C' for the primary rod.

E indicates the holding jaw having a bearing at $e$ against the body C, and a seating portion E' for pressing upon the rod A and clamping it against the seat C' in a manner similar to that described in my former patent above referred to.

F indicates the binder-stud, and G the binder-nut arranged at the outer end of said stud for securing the parts together, and the carrier or swivel-head D is provided with a transverse opening, lateral projections and seats $d$ for receiving the rod B; a conoidal portion or frictional surface that fits the socket or surface of the body C; and with an internal cavity or chamber H between the seats $d$ with a shoulder or incline and a central opening $h$ for the head $f$ of the pivot or binder-stud F; said chamber allowing the head $f$ to occupy a position beneath the rod B. The neck of the stud F is formed square or with a non-cylindrical portion F' that fits a correspondingly shaped hole through the body C, thus preventing the rotation of the stud within said body; while its head $f$, being of conical or circular form, permits the swiveling or rotation of the carrier D about the head $f$ as a center and within the conoidal socket of the part C.

A cap-plate I is fixed on the outer end of the swivel-head, and a spring or yielding holding-plate is arranged through the head beneath the cap-plate, the ends 2 2 of which bear upon the rod B and hold it with a yielding friction and pressure against the seats $d$. The cap-plate I can be secured to the swivel-head D in any suitable manner, but is preferably made as a crab with a series of arms I' having lugs $i$ at the end thereof that hook onto flanges or lugs 5 formed on the sides of the projecting seat portions $d$ of the head D. Lugs $m$ $m$ are provided at the interior of the head (see Fig. 4) upon which the sides of the central portion of the cap-plate rest for supporting it at proper position.

The holding-plate or spring J is best made as shown in Fig. 5, with side projections 6 that extend laterally within the internal cavity of the swivel-head, and with recesses $m'$ that match the lugs $m$, whereby said spring is retained in proper relation to said swivel-head and prevented from dislodgment when the rod B is removed therefrom. Small shoulders $n$ are formed at the sides of the opening that prevent said spring from rolling over or taking a sidewise position when the rod is removed from the head. A thumb-screw K is fitted in a threaded opening in the center of the cap-plate with its end bearing against the spring J for adjusting the spring or its pressure upon the surface of the rod B. By turning said screw in or out the tension or degree of force with which the rod is gripped can be varied and regulated so as to hold the rod more or less rigidly within the swivel-head; thus affording retention of the rod B at any position where it may be placed, while permitting its free adjustment by simply taking hold of and moving it to the position desired, without manipulation of fastening devices.

A bent washer P is arranged between the nut G and jaw E for affording a slight yielding action and variable degree of friction between the binding parts. A sufficient degree of friction can be maintained by adjustment of the binder G to hold the parts at any position of adjustment to which they may be passed, so that the swiveling movement can be accomplished without releasing the binder.

In the operation, the joint mechanism can be moved longitudinally and rotatively on the rod A. The swivel-head or rod-carrier D with the rod B held therein can be rotated about the axis of the stud F; or said rod rotated or moved longitudinally within the head D; thus affording a universal flexure between the rods. The tension or pressure whereby the supported rod is held can be varied by means of the screw K and plate J, so that any instrument affixed to said rod can be readily placed at any position desired and there caused to remain without manipulation of the fastening device or binder at each time of adjustment. In case the adjusting-joint is desired for use on the end of a bracket or rod, then it may be formed as shown in Fig. 9; the body C being provided with a boss or means $a$ for its connection to the rod A', rigidly or otherwise, the clamping jaw E being omitted, but the other parts being substantially the same as above described. Fig. 9 also shows the cap-plate as secured by screws S which are screwed into tapped openings formed in the lugs $m$. The bearings or seats $d$, C' and E', and the holding plate J can, if in any instance desired, be formed for receiving and holding rectangular or other shaped bars or rods in lieu of the cylindrical rods A and B herein shown; this modification requiring merely a slight change in the form or contour of the bearing surfaces, the operation of the mechanism being substantially as above described.

I claim as my invention herein, to be secured by Letters Patent—

1. In an adjusting and clamping joint mechanism of the character specified, the swivel-head or rod-carrier having a seat for the supported rod, and provided with an internal chamber for containing the head of the binder-stud under said rod, and the binder-stud disposed with its head rotatively confined in the carrier chamber and its neck non-rotative in the body part, in combination with the body whereon said swivel-head is supported, and the binder or nut connected with said stud, for the purpose set forth.

2. An adjusting and clamping joint mechanism, comprising the main part or body having at one side a conoidal friction surface, and at its other side a seat for the primary rod, the clamping jaw disposed opposite said seat, the swivel-head fitted to match against the frictional surface of the body, and having the transverse opening and seats for the secondary rod, a cap-plate at the outer end of said head and a spring or bearing plate for retaining the rod therein, an internal cavity and shoulder beneath the rod seats in said swivel-head, the binder-stud having its head fitted in said cavity bearing on said shoulder, its shank extending through the body and jaw parts, the binder nut on the end of said stud, and the yielding washer disposed between said binder and jaw, for the purposes set forth.

3. An adjusting and clamping joint mechanism comprising a frictional-faced disk or body, provided with means for its attachment to the primary rod, a swivel-head frictionally fitted to the face of said body, and provided with seats for the secondary rod, a center-stud and binder that controls the primary-rod-clamp and swiveling action, and a yielding holder-plate that frictionally retains the secondary rod at position in said swivel-head while permitting its ready adjustment by simply moving said rod to the position desired.

4. In an adjusting and clamping joint mechanism, the combination of the conoidally recessed body having means for its attachment to the primary rod, the swivel-head matching the conoidal recess of the body, and having lateral projections with recesses or seats for the supported rod, the spring-plate disposed through the swivel-head opposite said seats for retaining the rod thereon, a pivoting axis about which said head rotates and a regulating screw fitted in the swivel-head cap with its point against said spring-plate for adjusting the tension or pressure thereof upon the rod, for the purpose set forth.

5. The spring or presser-plate J provided with side projections 6, recesses $m'$, and end portions 2, 2, in combination with the internally recessed swivel-head having the rod-supporting seats $d$, side lugs $m$ and shoulders $n$ $n$ formed therein, the cap plate I, and the removable rod supported in said swivel-head, for the purpose set forth.

6. The cap-plate I having the arms I' and lugs $i$, the swivel-head or carrier D'having the inwardly projecting side lugs $m$, and the outwardly projecting rod-supporting seats $d$ with lateral lugs or flanges 5 beneath which the ends $i$ of said cap-plate arms are locked; in combination with the rod B, the holder or spring-plate, the pivoting-stud and body whereon said swivel-head is supported.

Witness my hand this 2d day of March, A. D. 1893.

OTIS C. WHITE.

Witnesses:
CHAS. H. BURLEIGH,
ELLA P. BLENUS.